United States Patent [19]
Byrge

[11] Patent Number: 4,652,026
[45] Date of Patent: Mar. 24, 1987

[54] MANUAL PROPULSION APPARATUS FOR WHEELCHAIRS

[76] Inventor: Jerome J. Byrge, 3609 N. Sherman, Madison, Wis. 53704

[21] Appl. No.: 779,494

[22] Filed: Sep. 24, 1985

Related U.S. Application Data

[63] Continuation-in-part of Ser. No. 571,717, Jan. 18, 1984, abandoned.

[51] Int. Cl.$^4$ .......................... B62M 1/14; B62M 3/14
[52] U.S. Cl. .............................. 280/242 WC; 280/246; 280/255; 280/289 WC; 297/DIG. 4
[58] Field of Search ........... 280/242 R, 242 WC, 244, 280/246, 252, 253, 255, 289 WC; 297/DIG. 4

[56] References Cited

U.S. PATENT DOCUMENTS

| | | | |
|---|---|---|---|
| 422,087 | 2/1890 | Loser | 280/246 |
| 2,130,426 | 4/1938 | Henderson | 280/244 |
| 2,798,565 | 7/1957 | Rosenthal | 180/907 X |
| 2,847,058 | 8/1958 | Lee | 297/44 |
| 2,876,486 | 3/1959 | Lindstrom | 74/556 |
| 3,100,547 | 8/1963 | Rosenthal | 180/907 X |
| 3,104,112 | 9/1963 | Crail | 280/242 WC |
| 3,189,368 | 6/1965 | Petersen | 280/242 WC |
| 3,208,318 | 9/1965 | Roberts | 81/177.85 |
| 3,623,748 | 11/1971 | Haynes | 280/242 WC |
| 3,666,292 | 5/1972 | Bartos | 280/242 WC |
| 3,905,437 | 9/1975 | Kaiho et al. | 180/907 X |
| 3,994,509 | 11/1976 | Schaeffer | 280/242 WC |
| 4,265,148 | 5/1981 | Gartzke | 81/57.29 |
| 4,358,126 | 11/1982 | Mitchell et al. | 280/242 WC |
| 4,453,729 | 6/1984 | Lucken | 280/242 WC |
| 4,506,900 | 3/1985 | Korosue | 280/242 WC |
| 4,560,181 | 12/1985 | Herron | 280/242 WC |

FOREIGN PATENT DOCUMENTS 4205 9/1979 European Pat. Off. .

*Primary Examiner*—John J. Love
*Assistant Examiner*—Charles R. Watts
*Attorney, Agent, or Firm*—Isaksen, Lathrop, Esch, Hart & Clark

[57] ABSTRACT

Apparatus for manually propelling wheelchairs includes a drive wheel which is mountable to a wheelchair in a manner which allows frictional rolling contact with a wheelchair propulsion wheel; a two-armed hand lever which is pivotally mountable to the wheelchair so as to be manually accessible to the wheelchair occupant; and a drive mechanism, preferably including a reversible-drive ratchet, which is operably connected to the hand lever and operably attached to the drive wheel so that a wheelchair occupant may propel the wheelchair by reciprocally pivoting the hand lever. The apparatus can be supplied in kit form, and the hand lever and the drive wheel may be mounted directly to a side panel so that the apparatus may be substantially installed by securing the side panel to the wheelchair. A method for retrofitting wheelchairs in this manner is also disclosed. Additional features include pivot handles for disengagingthe drive wheel, a therapeutic grasping knob, a ratchet selector dial, a hand lever pivot mount which allows adjustment of leverage and orientation of the accessible hand lever arm, and an adjustable drive bar for providing a fit for wheelchairs of various lengths. Preferably there is a drive wheel, a hand lever, and a drive mechanism for each of the two propulsion wheels on conventional wheelchairs. An expansion shaft is disclosed for connecting the drive wheels so both will rotate by pivoting one hand lever. The expansion shaft can be adjustable in length to provide a fit for chairs of various widths.

6 Claims, 5 Drawing Figures

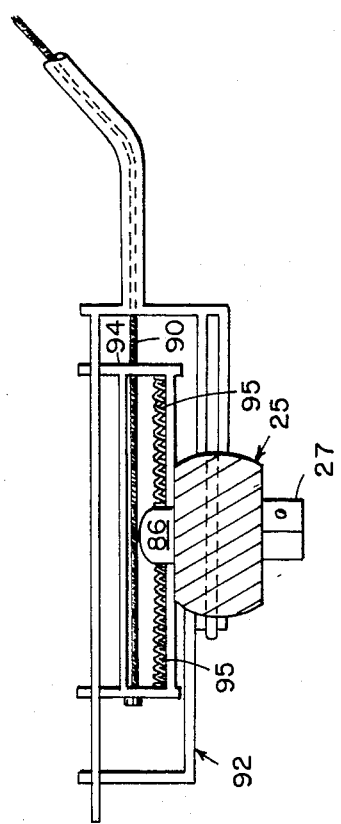
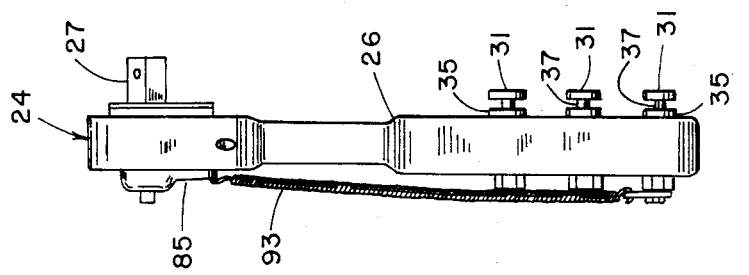
Fig 4
Fig 3

MANUAL PROPULSION APPARATUS FOR WHEELCHAIRS

This is a continuation-in-part of my prior application Ser. No. 571,717 filed Jan. 18, 1984, now abandoned.

TECHNICAL FIELD

This invention relates to apparatus for propelling wheelchairs, and particularly to apparatus for fitting the propulsion wheels of standard wheelchairs with adjustable, occupant operated, manual lever drives.

BACKGROUND OF THE INVENTION

Standard wheelchair designs utilize wheel mounted frames having a seat, a back rest, and opposed arm rests. Side panels are in some cases provided between the seat and the arm rests. Nowadays each side of the frame is generally mounted on a large diameter propulsion wheel located near the rear of the wheelchair and a smaller caster-mounted wheel located near the front of the frame. Hand rims are typically attached near the outer surfaces of the rear propulsion wheels to enable the chair occupant to propel the chair by gripping the hand rims and manually rotating the wheels. However, whether because of convenience or lack of care, the chair occupant will often grip the treads of the propulsion wheel rather than the hand rim. This practice can be unsanitary and even dangerous.

A number of devices have been desfgned to enable a wheelchair occupant to manually propel the propulsion wheels without requiring hand contact with the wheel tread. U.S. Pat. No. 2,876,486 to Lindstrom discloses a flexibly resilient handgrip which serves as a barrier between the wheel tread and the hand of the wheelchair occupant. Such a device requires a manual dexterity often lacking in wheelchair users, and can fall from the occupant's possession if not perpetually anchored within reach. A manual self-propulsion mechanism for wheelchair occupants which comprises axle-mounted levers radially extending from the propulsion wheels and carrying contact shoes for engaging the wheel tread is shown in U.S. Pat. No. 3,189,368 to Petersen. Another axle-mounted, tread-engaging lever drive is shown in U.S. Pat. No. 2,130,426 to Henderson. Side-by-side wheel rims which may be frictionally engaged by sliding contact shoes having knob-like hand grips are shown in U.S. Pat. No. 3,623,748 to Haynes. These four mechanisms might with varying degrees of difficulty be adapted for retrofitting wheelchairs of conventional design. However, the gouging action of the Henderson device can lead to a wheel tread wear, and the other mechanisms suffer the disadvantages of placing a user's hands in close proximity to the wheel treads with a resulting likelihood that contaminating contact or injury to the user's hand will occur. The Haynes device also lacks reverse propulsion capability and thus seriously limits a user's maneuverability.

A sprocketed hand wheel which is connected through a drive chain to a sprocketed forward-mounted propulsion wheel is shown in U.S. Pat. No. 2,847,058 to Lee. Pivotal yolk propulsion levers which are mounted to the propulsion wheel axle are shown in U.S. Pat. No. 3,301,574 to Good, and a lever operated crank-shaped propulsion wheel axle is shown in U.S. Pat. No. 3,666,292 to Bartos. These three devices are shown as components of custom designed wheelchairs and are not generally suitable for more universal use with the common designs of modern wheelchairs. U.S. Pat. No. 4,453,729 to Lucken shows another customized wheelchair having a lever-driven device which provides propulsion wheel drive through axle ratchets. European Pat. No. 0,004,205 to Mitchell shows a customized velociman having two propulsion wheels which are individually propelled by manually operated ratchet drive mechanisms that engage the propulsion wheel shafts. U.S. Pat. No. 3,994,509 to Schaeffer, describes a lever powered clutch drive for wheelchairs having customized propulsion wheels with sprocketed center hubs.

In some designs such as that shown in U.S. Pat. No. 3,104,112 to Crail, crank-driven friction wheels have been provided to directly engage the treads of the wheelchair propulsion wheels. Upon cranking, the friction wheels rotate to in turn drive the propulsion wheels. Motor driven driving drums as shown in U.S. Pat. No. 2,798,565 to Rosenthal, et al. have also been placed in direct contact with wheelchair propulsion wheels to provide frictional propulsion as the drums rotate. Neither of these devices demonstrates the simplicity, efficiency or mechanical advantages of a manually operated bar lever; nor is either device adapted for convenient installation on modern conventional wheelchairs.

SUMMARY OF THE INVENTION

The invention herein described is designed for convenient use with most conventional wheelchairs and includes a drive wheel which is mountable to such wheelchairs in a manner which allows frictional rolling contact with a wheelchair propulsion wheel. The wheelchair is propelled by reciprocally pivoting a two-armed hand lever which is mountable to the wheelchair so as to be manually accessible to a wheelchair occupant, and is operably connected to the drive wheel through a drive mechanism which converts the reciprocal movement of the hand lever into rotational movement of the drive wheel. The drive mechanism preferably includes a common reversible-drive ratchet wrench which has forward, neutral, and reverse settings. A drive bar is disclosed which connects the hand lever to any of several points along the handle of the ratchet such that the torque achieved by each pivot stroke may be adjusted. The inventive apparatus is preferably supplied in kit form for convenient installation on standard wheelchairs. To facilitate installation of the kit, the hand lever and the drive wheel may be pre-mounted onto a side panel which may then be conveniently secured onto the wheelchair. This allows a user to substantially install the apparatus by attaching the side panel. The method for retrofitting wheelchairs by utilizing such premounting is also disclosed.

Other features of the disclosed apparatus include a pivot handle which allows an attendant to disengage the drive wheel, a grasping knob which provides a means of hand therapy for the wheelchair occupant, a selector dial which facilitates an occupant's selection of a drive setting, and a hand lever pivot mount which allows adjustment of the hand lever leverage and orientation.

The apparatus preferably includes separate drive wheels, levers, and drives for each of the two propulsion wheels on conventional wheelchairs. The left and right drive wheels can be connected through an expansion shaft in order to achieve rotation of both drive wheels by pivoting the same hand lever. A kit which includes an expansion shaft and drive bars which are all adjustable in length is particularly versatile for use with wheelchairs of varying lengths and widths.

Further objects, features and advantages of the invention will be apparent from the following detailed description when taken in conjunction with the accompanying drawings.

BRIEF DESCRIPTION OF THE DRAWINGS

FIG. 3 is a detailed view of a ratchet wrench as used in the apparatus of FIG. 1.

FIG. 4 is a section through a drive setting shift box for an adjustable ratchet wrench.

DESCRIPTION OF THE PREFERRED EMBODIMENT

Figure 1:
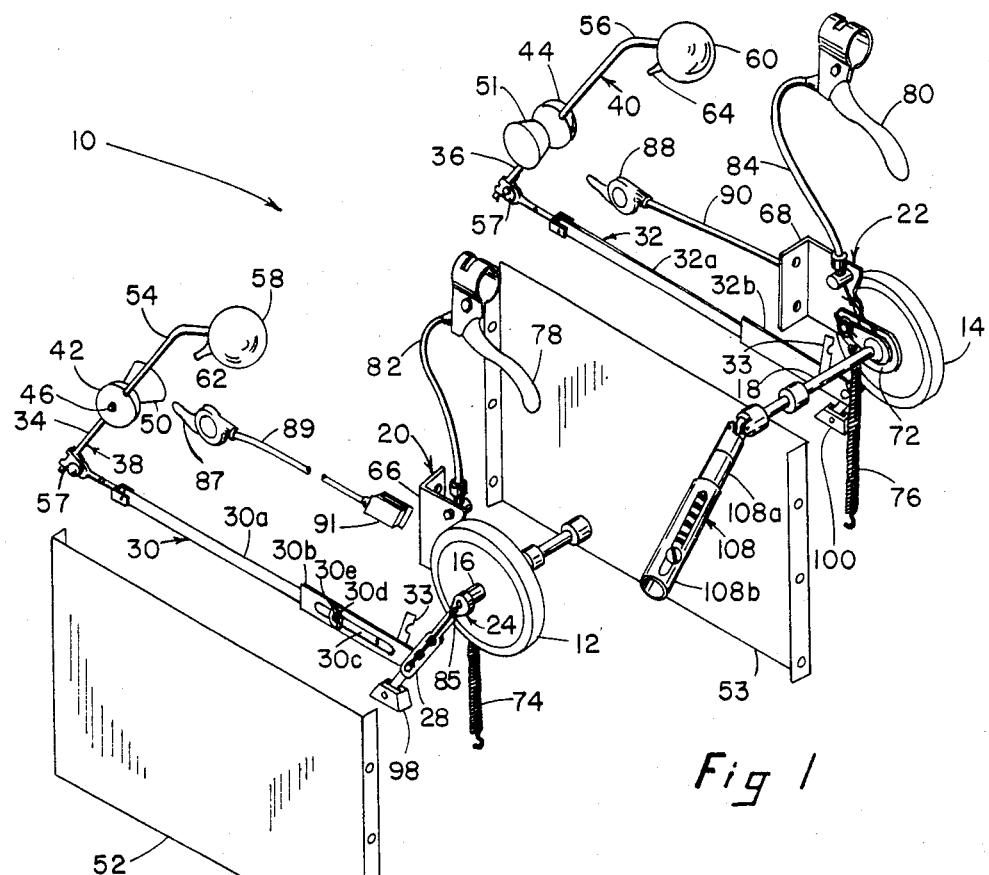
FIG. 1 is a perspective view of the preferred apparatus of this invention.

An apparatus for fitting a standard wheelchair for manual propulsion which is constructed in accordance with this invention is shown generally at 10 in FIG. 1. The apparatus 10 is preferably supplied as a kit which may be retrofitted to conventional wheelchairs as exemplified in FIG. 2. The apparatus includes drive wheels 12 and 14 respectively suitable for rolling contact with the treads of standard wheelchair propulsion wheels situated to the left and right of a wheelchair occupant. Preferably, each drive wheel 12 and 14 is rigidly mounted on its respective axle 16 and 18, and brackets 20 and 22 are provided as means for rotatably mounting each axle 16 and 18 respectively to the frame of a standard wheelchair. Means such as square sockets (not shown) are provided at the end of each axle 16 and 18 for respectively connecting ratchets 24 and 25 thereto. The ratchets 24 and 25 have ratchet handles, 26 and 28 respectively, and means, such as the square driving stud 27 shown in FIG. 3, for engaging the respective axle 16 or 18.

The ratchet handles 26 and 28 are pivotally connected to one end of the drive bars 30 and 32 respectively. The drive bars 30 and 32 are preferably adjustable in length to enhance the fit of the apparatus 10 to wheelchairs of different lengths and to suit the comfort of individual users. Adjustability of preferred drive bars 30 and 32 is attained by respectively providing first bar portions 30a and 32a with cross sections that are sized to slide within tubular second bar sections 30b and 32b. Each second bar section 30b and 32b has a longitudinal slot 30c and 32c and each first bar section 30a and 30b has a conventionally threaded post 30d and 32d which extends through the respective slot such that wing nut 30e and 32e may be threaded onto the respective post. Tightening the enlarged head of each wing nut 30e and 32e against the respective second bar section consequently clamps the respective first bar section to the second bar section such that the drive bar is fixed at the desired length.

In the preferred embodiment, each ratchet handle 26 and 28 has a plurality of connection points along its length, represented by bolts 31 in FIG. 3, so that the point of connection to the drive bars 30 and 32 may be adjusted as desired by a user to achieve the optimum torque. Pivoting lock bars 33 may be mounted to the drive bars 30 and 32 to hold the drive bars at the desired connection point on the ratchet handles 26 and 28. In particular, for the structure shown in FIG. 3 for ratchet 24, the drive bars may have holes (not shown) sized to fit around shoulders 35 of bolts 31, and the lock bars 33 may then be fitted into two grooves 37 to hold the drive bars in place on the ratchet handle 26.

The second ends of the drive bars 30 and 32 are pivotally connected to first arms 34 and 36 of the respective hand levers 38 and 40. The hand levers 38 and 40 are fitted through channels (not shown) in pivot knobs 42 and 44 and locked in position therein using set screws 46 and 48. The pivot knobs 42 and 44 are rotatably connected to bases 50 and 51 respectively, and the bases 50 and 51 are respectively adapted for attachment to left and right wheelchair side panels. Side panels 52 and 53 are provided as part of the preferred kit. This allows pre-mounting of the hand levers 38 and 40 to side panels 52 and 53 within a kit so that the hand levers may then be mounted to a wheelchair merely by affixing the kit side panels thereon. However it is understood that bases 50 and 51 may be attached to original chair side panels, or even otherwise attached to the wheelchair sides as by clamping to wheelchair arm rests. In any case, pivot knobs 42 and 44 provide pivot points for the hand levers 38 and 40. Other means of pivoting the hand levers 38 and 40 will be evident to those skilled in the art and are within the scope of this invention; but the channeled pivot knobs 42 and 44 allow the user to adjust the lever positions within the pivot knobs and thereby to adjust the relative lengths of the first and second lever arms. The leverage attained in each stroke of the lever can thus be adjusted according to user preference. The second arms 54 and 56 of the respective hand levers 38 and 40 are preferably bent for user convenience. Moreover, the preferred hand levers 38 and 40 have circular cross sections and are connected to the respective drive bars 30 and 32 using ball and socket-type joints 57 such that when each set screw 46 or 48 is loosened, the respective hand lever may be rotated within its pivot knob so that the orientation of the bend in each second hand lever arm may be adjusted for convenience of the user.

Grasping knobs 58 and 60 can be provided at the end of the second lever arms 54 and 56 to allow the wheelchair occupant to exercise his hands and fingers. The grasping knobs 58 and 60 are preferably hollow and have means such as sealable nipples 62 and 64 for introducing water, granular material such as sand, or pressurized air so that the resilient tone of the grasping knobs may be adjusted. These preferred grasping knobs are particularly useful as therapy tools for those wheelchair occupants affected by arthritus of the hand or those recovering from a stroke.

The brackets 20 and 22 of the preferred embodiment have first bracket portions 66 and 68 respectively which are adapted to be rigidly affixed to the wheelchair and the second bracket portions 70 and 72 which are pivotally mounted to the respective first portions. In the preferred kit the brackets 20 and 22 are pre-mounted to side panels 52 and 53 such that they may be affixed to the wheelchair merely by securing the side panels thereon. Axles 16 and 18 are mounted to the respective second bracket portions 70 and 72 and extension springs 74 and 76 are respectively affixed to the second portions 70 and 72 and adapted to be attached to the wheelchair frame in a manner which biases the drive wheels 12 and 14 against the treads of the wheelchair propulsion wheels.

The preferred apparatus 10 includes pivot handles 78 and 80 which may be clamped near the rear handles of conventional wheelchairs. The pivot handles 78 and 80 respectively control conventional sheathed cables 82 and 84 which extend to the respective second bracket portions 70 and 72. The cables 82 and 84 can be attached to the second bracket portions either directly, or indirectly by engaging axles 16 and 18. In any case, the cables 82 and 84 are mountable such that when the drive wheels 12 and 14 are appropriately installed on a wheelchair, actuation of each pivot handle 78 and 80 by compressing it toward the rear wheelchair handle to which it is clamped, raises the respective drive wheel from contact with the wheelchair propulsion wheel. The pivot handles 78 and 80 thus allow the attendants of wheelchair occupants to take control of the wheelchair as necessary.

The preferred ratchets 24 and 25 utilize conventional, commercially available, reversible ratchet wrenches having grasp mechanisms (not shown) which function in either direction and which may be disengaged entirely. Such wrenches are commonly available in hardware stores such as Sears and typically have selector tabs shown as 85 and 86 which allow the user to adjust or disengage the ratchet grasp mechanism. The apparatus 10 can consequently be provided with dials 87 and 88 which control the position of tabs 85 and 86 through conventional sheathed cables 89 and 90 and drive setting shift boxes 91 and 92. As best shown in FIG. 3 and FIG. 4, each tab 85 and 86 can be biased, as by spring 93, toward the centrally located neutral setting, and the shift box 91 and 92 can be affixed around the respective tab. As shown for ratchet 25 in FIG. 4, movement of the respective dial 88 adjusts the cable 90 attached thereto, thereby shifting a shift bar 94 and positioning the tab 86. The shift bar 94 is shown in FIG. 4 attached to tab 86 under the tension of springs 95. This allows the ratchet to rotate without a totally rigid tab setting which might otherwise jam the ratchet grasp mechanism. In any case, use of adjustable drive wrenches which may be controlled by accessible dials allows an occupant of a wheelchair on which the apparatus has been installed to use the apparatus for forward or reverse movement of either wheelchair propulsion wheel; and the occupant may also disengage the ratchet mechanism entirely to achieve free-wheeling.

When the apparatus 10 is properly connected to a wheelchair with a ratchet in a drive setting, an occupant may propel the wheelchair by reciprocally pivoting the appropriate second hand lever arm. This reciprocation in turn reciprocates the respective first hand lever arm, and drive bar, to impart reciprocal movement to the respective ratchet. The ratchet then converts the reciprocal movement into rotational movement of the drive wheel to drive, through frictional rolling contact, the respective wheelchair propulsion wheel. It will be evident that the reciprocal movement of the second lever arm alternates between a power stroke which provides leverage for propelling the wheelchair as the ratchet rotates in one direction with its grasp mechanism engaged such that drive force is transmitted, and a reset stroke in which the ratchet rotates in the other direction without transmitting drive force. Weights 98 and 100 may be provided as shown to bias the lever arms to a pre-power stroke position when the wheelchair occupant ceases to apply leverage to the respective second hand lever arm, 54 and 56.

The apparatus heretofore described allows a user to independently propel the left and right side propulsion wheels of a wheelchair. Such independent control allows a wheelchair occupant to easily achieve the maneuverability needed to pass through doorways or otherwise closely steer a wheelchair. However, in some instances, such as when the user has only one arm, it is desirable to have both propulsion wheels driven from one side. For such instances, the preferred apparatus has an expansion shaft 108 which may be reversibly secured between the axles 16 and 18. The preferred expansion shaft 108 is adjustable in length, having a first portion 108a with a cross-section sized to slide within a tubular second portion 108b. The first portion 108a can be spring biased as shown so that it compresses within the second portion 108b to extend therefrom only so far as is necessary to connect axles 16 and 18. This provides an adjustment mechanism for fitting the widths of various wheelchairs. The expansion shaft 108 may be removed when not in use.

Figure 2:
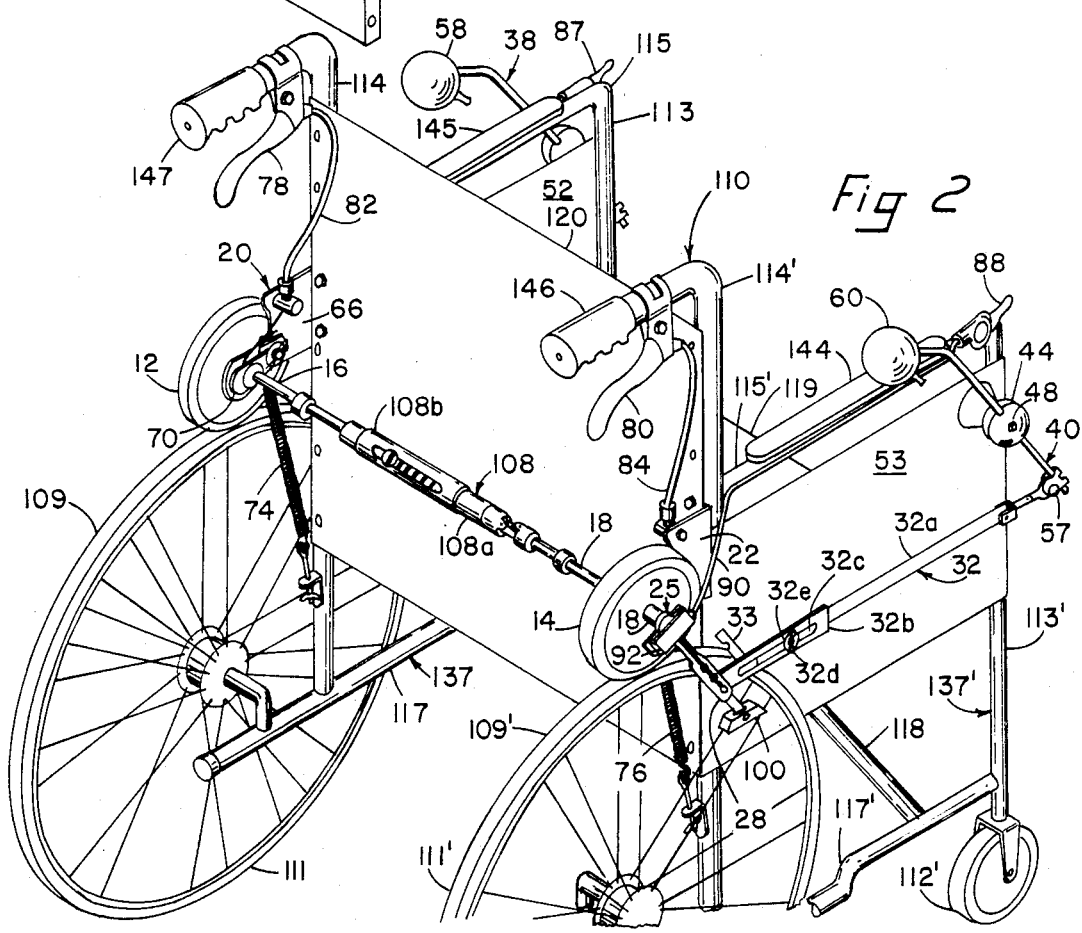
FIG. 2 is a perspective view showing the preferred apparatus installed on a wheelchair.

FIG. 2 shows a wheelchair 110 of a well known collapsible design on which the apparatus 10 has been installed. The wheelchair 110 has a pair of large diameter rear propulsion wheels 111, 111', and a pair of smaller diametered front caster wheels. (Only the right side front wheel is shown as 112' in FIG. 2.) The wheels are mounted as shown on rigid, upstanding side frame assemblies 137, 137' having upright, front tubular portions 113, 113' and rear, upright tubular portions 114 and 114' which are connected front to rear by upper side rails 115, 115', middle side rails (not shown), and lower side rails 117, 117' respectively. Side frame assemblies 137, 137' are maintained in parallel planes by a laterally extending foldable cross brace 118 mounted pivotally on the lower and middle side rail portions in a manner which enables wheelchair 110 to be operably disposed either in expanded and locked configuration as shown or in collapsed configuration (not shown). In the collapsed configuration the seat 119 and back sling 120 are respectively yieldably draped between side frame assemblies 137, 137'. When the wheelchair is fully folded the side frames are disposed in near contacting adjacency.

Wheelchair 110 is of well known construction and constitutes by itself no part of this invention. However, as shown in FIG. 2, the conventional wheelchair 110 can be fitted with a kit containing the manual propulsion apparatus 10 of this invention. The installation of the right hand side of the assembly 10 is shown in FIG. 2 with the left hand side being installed in substantial symmetry therewith. As shown in FIG. 2 the right side drive wheel 14 is disposed in contacting adjacency to the tread 109' of wheel 111' and is rotatably mounted to the wheelchair on axle 18. The axle 18 is mounted by pivotal offset connection provided by bracket 22 to tubular portion 114' and is biased by spring 76 to maintain drive wheel 14 in contact with wheel 111'. Pivot handle 80 is secured near rear wheelchair handle 146. Flexible sheathed cable 84 is secured to the axle 18 at one end and to pivot handle 80 at the other so as to enable the axle to be displaced by manipulation of handle 80, thereby disengaging drive wheel 14 from contact with wheel 111'.

As described above, ratchet drive means comprising ratchet 25 is operably affixed to drive wheel 14 in a manner which transmits rotative drive force to the drive wheel. A preferred ratchet comprises a reversible drive ratchet wrench, many models of which are commonly in use, such as for example one described in U.S. Pat. No. 3,208,318 to Roberts. The preferred embodiment has a ratchet-head-mounted manual selector tab 86 with forward and reverse drive positions, and a free-turning neutral position intermediate the two drive positions. Such ratchet is depicted in FIG. 3. It will be evident to those skilled in the art that the apparatus may be modified within the scope of the invention to use other drives such as the reversible, overrunning clutch drive ratchet described in U.S. Pat. No. 4,265,148 to Gartzke, in substitution for the preferred ratchet described above.

Hand lever 40 is pivotally mounted on side panel 53 using pivot knob 44 and base 51; and side panel 53 is affixed to the right side of the wheelchair 110. A resiliently squeezable grasping knob 60 is provided on the upper extremity of hand lever 40 and is disposed conveniently adjacent armrest 144 of wheelchair 110. Lower extremity pivotal connection is made to hand lever 40 by drive bar 32, the other end of the drive bar being pivotally connected to ratchet handle 28. The hand lever 40 and connecting linkage provides means for transmitting fore-and-aft arcuate working of grasping knob 60 to operable swinging actuation of ratchet handle 28 for turning drive drive wheel 14 and propulsion wheel 111'.

Selection of right hand or left hand drive for the ratchet 25 (i.e. forward and reverse drive respectively for wheelchair 110) is made in the hereinabove described wrench embodiment by rotating a face-mounted selector tab 86 on ratchet 25 through several degrees of arc in one rotative direction or the other. Selector dial 88 shown mounted on frame assembly 137' near front portion 113' comprises a sheath cable 90 and preferably a gear ratio selector mechanism commonly used in multi-speed hub bicycles connected operably to selector tab 86 on ratchet 25. This enables a wheelchair occupant to select forward, neutral or reverse drive actuation for wheelchair 110 without being required to remove his arm from the chair armrest 144.

In operation, push-pull manual biasing of grasping knob 60 on hand lever 40 operably works ratchet 25 by swing actuation of ratchet handle 28, and causes drive wheel 14 to be driven intermittently in one direction of rotation or the other, with the motion being transmitted to wheel 111' when drive wheel 14 is disposed in frictional contact therewith. Weight 100 may be added to influence the ratchet back from its end stroke position. Manual actuation by a wheelchair attendant of handle 80 biases upward an offset axle 18 on which drive wheel 14 is mounted, thus disengaging the drive wheel from contact with wheel 111' so as to enable the wheelchair to be freely wheeled by an attendant without positioning selector tab 86 in neutral position. Attachment of the ratchet wrench drive to drive wheel 14 may be made by spring loaded detent-retained socket means on the wrench or by other operable means including permanent attachment, if desired.

Grasping knob 60 is preferably flexibly resilient and can comprise a foam rubber or foam plastic envelope which compresses when squeezed in a manner necessary to manipulate the grasping knob, thereby providing exercise therapy and restorative function for arthritic patients as a necessary consequence of push-pull manipulation necessary to operate the drive means. Placement of grasping knobs 58 and 60 avoids the necessity of a user having to place his hands near the wheel treads.

While FIG. 2 best shows connection of the apparatus of this invention on the right hand side of wheelchair 110, it will be evident that the preferred apparatus is to be similarly connected on the left hand side of said wheelchair with base 50 attached to the outside of side panel 52, side panel 52 affixed to the left side of the wheelchair 110, bracket 20 mounted to tubular portion 114, drive wheel 12 frictionally contacting the tread 109 of propulsion wheel 111, selector dial 87 accessibly mounted on frame assembly 137 near arm rest 145, pivot handle 78 mounted near rear wheelchair handle 147, and spring 74 attached to tubular portion 114. Preferably, as shown in FIG. 2 and described above, the axles 16 and 18 of left drive wheel 12 and right drive wheel 14 respectively may be linked using expansion shaft 108 to allow operation of both drive wheels 12 and 14, and consequently rotation of both propulsion wheels 111 and 111', by manipulation of only one hand lever 12 or 14. In such a situation, the selector dial controlling the unused ratchet is preferably set at neutral. Alternatively, the hand lever and the unused mechanism between the hand lever and the drive wheel may be removed.

Figure 5:
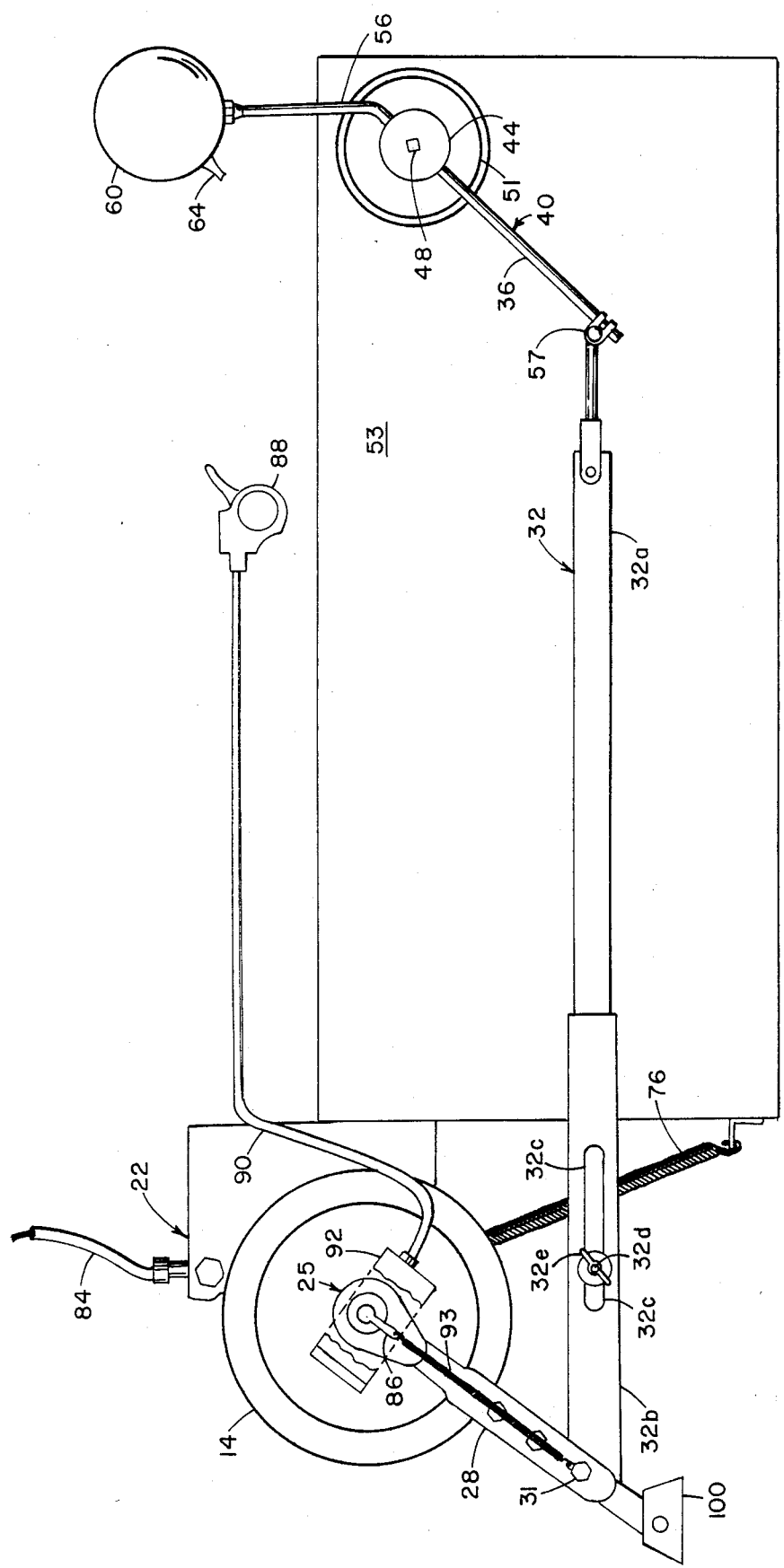
FIG. 5 is a detailed view of a side panel with a drive wheel and hand lever mounted thereon.

Moreover, it will be evident from the above description that the brackets 20 and 22 and the bases 50 and 51 may be pre-mounted onto the respective side panels 52 and 53 such that the drive wheels 12 and 14 as well as the hand levers 38 and 40 may be mounted to a wheelchair merely by securing the side panels in place. This is shown for a right side panel in FIG. 5. The springs 74 and 76 may also be pre-extended between the bracket portions 70 and 72 and the respective side panel. In any case, pre-mounting of a substantial portion of the apparatus greatly improves the convenience of the disclosed kit. Indeed the method of substantially pre-mounting a manual propulsion apparatus onto the side panels to facilitate installation is itself novel and includes the steps of providing the side panels, pre-mounting the drive wheels, the drive mechanism and the hand levers thereto, and then securing the side panels to a wheelchair.

The hand levers, drive bars, ratchets, side panels and expansion shaft are made of stainless steel, other suitable metal, or even rigid plastic. Exposed parts can be plated with chromium or brass to accommodate cleaning. The drive wheels preferably have rubber-like contact surfaces for minimizing slippage as they propel the wheelchair. The pivot handles 78 and 80 can be made from bicycle-type hand brake control handles.

The materials, parts, and methods of assembly disclosed above are those preferred by the inventor. It is understood that the present invention is not limited to the materials, construction, arrangement of parts, and methods illustrated and disclosed above. Instead it embraces all such modified forms thereof as come within the scope of the following claims.

What is claimed is:

1. An apparatus for use by a wheelchair occupant in manually propelling a wheelchair with a propulsion wheel comprising:
    (a) a drive wheel with axle mounted to the wheelchair, the drive wheel being in frictional rolling contact with the propulsion wheel of the wheelchair so that the propulsion wheel is propelled by rotating the drive wheel;
    (b) a ratchet having a driving stud which is connected to the axle to transmit rotative drive force from the ratchet to the drive wheel, said ratchet having at least one drive setting wherein the ratchet transmits drive force to the drive wheel when the ratchet is rotated in one direction, but transmits no substantial drive force to the drive wheel when rotated in an opposite direction;

(c) a hand lever pivotally mounted to the wheelchair at a hand lever pivot point, the hand lever including
 (i) a first hand lever arm extending from the hand lever pivot point to a point of pivotal operable connection to the ratchet, said point of pivotal operable connection a selected distance from an axis of rotation of the ratchet so that the ratchet is reciprocally rotated by pivoting the first hand lever arm, and
 (ii) a second hand lever arm extending from the hand lever pivot point to a position manually accessible to the wheelchair occupant so that when the ratchet is in a drive setting, the occupant reciprocally rotates the ratchet to propel the wheelchair by pivotally moving the second hand lever arm in one direction to leveragedly move the entire hand lever and rotate the ratchet thereby propelling the wheelchair, and by pivotally moving the second hand lever arm in the opposite direction resetting the entire hand lever and ratchet to prepare them for another leveraged movement thereof to again propel the wheelchair;

(d) a flexibly resilient gasping knob at an occupant end of the second hand lever arm wherein the grasping knob is hollow and is filled with a selected amount of a fluid material so as to allow selection of a chosen degree of grasping knob resiliency.

2. An apparatus for use by a wheelchair occupant in manually propelling a wheelchair with two conventional propulsion wheels respectively positioned on left and right sides of the wheelchair, the apparatus comprising:

(a) a drive wheel and a drive wheel axle for each propulsion wheel and mountable to the wheelchair so as to be in frictional rolling contact with the respective propulsion wheels, so that each propulsion wheel may be propelled by rotating its respective drive wheel;

(b) a ratchet for each drive wheel, the ratchets each having a driving stud which is connected to a respective drive wheel axle to transmit rotative drive force from each ratchet to its respective drive wheel, each ratchet having at least one drive setting werein the ratchet transmits drive force to its respective drive wheel when the ratchet is rotated in one direction, but transmits no substantial drive force to its respective drive wheel when rotated in an opposite direction;

(c) a hand lever for each ratchet respectively mountable in a pivotal manner to the left and right sides of the wheelchair each hand lever having first and second hand lever arms extending in generally opposite directions from a hand lever pivot point, said second hand lever amrs extending to positions on the respective sides of the wheelchair which are manually accessible to the wheelchair occupant;

(d) drive bars for each hand lever which are pivotally connected at one end to the respective first hand lever arm and are pivotally connected at the other end to the respective ratchet a selected distance from an axis of rotation of the ratchet, so that when the ratchets are in a drive setting, the occupant propels each wheelchair propulsion wheel by pivotally powering the hand lever in one direction to provide leverage for propelling the wheelchair, and the occupant resets the hand levers for another leverage stroke by pivoting them in the opposite direction;

(e) right and left side panels for the wheelchair on which the drive wheel, the ratchet, the hand lever, and the drive bar for propelling each propulsion wheel are respectively mounted so that the apparatus is substantially installed by affixing the respective side panels to the left and right sides of the wheelchair.

3. A kit for retrofitting most conventional wheelchairs which have at least one propulsion wheel, for manual propulsion by the wheelchair occupant, comprising:

(a) a drive wheel engageable in frictional rolling contact with a propulsion wheel of most conventional wheelchairs so that the propulsion wheel is propelled by rotating the drive wheel;

(b) means for fitting the drive wheel onto said wheelchairs so that the drive wheel is in frictional rolling contact with the propulsion wheel;

(c) a drive mechanism for rotating the drive wheel while the drive wheel is in frictional rolling contact with the propulsion wheel, said drive mechanism being operable connected to the drive wheel so that imparting reciprocal movement to the drive mechanism rotates the drive wheel;

(d) a hand lever pivotally mountable to the wheelchair, the hand lever including
 (i) a first hand lever arm extending from a hand lever pivot point to a point of operable connection to the drive mechanism so that reciprocal movement is imparted to the drive mechanism by reciprocally pivoting the first hand lever arm, and
 (ii) a second hand lever arm extending from the hand lever pivot point so that the wheelchair occupant imparts reciprocal movement to the drive mechanism by reciprocally pivoting the second hand lever arm, thereby propelling the wheelchair; and (e) a means for fitting the hand lever to the wheelchair so that the second hand lever arm is manually accessible to the occupant, the hand lever fitting means including a side panel which fits onto a side of most conventional wheelchairs and the hand lever is pivotally mounted to the side panel prior to fitting the side panel onto the wheelchair.

4. A kit for retrofitting most conventional wheelchairs which have at least one propulsion wheel, for manual propulsion by the wheelchair occupant, comprising:

(a) a drive wheel engageable in frictional rolling contact with propulsion wheel of most conventional wheelchairs so that the propulsion wheel is propelled by rotating the drive wheel;

(b) a drive mechanism for rotation the drive wheel while the drive wheel is in frictional rolling contact with the propulsion wheel, said drive mechanism being operably connected to the drive wheel so that imparting reciprocal movement to the drive mechanism rotates the drive wheel;

(c) a hand lever pivotally mountable to the wheelchair, the hand lever including
 (i) a first hand lever arm extending from a hand lever pivot point to a point of operable connection to the drive mechanism so that reciprocal movement is imparted to the drive mechanism by reciprocally pivoting the first hand lever arm, and (ii) a second hand lever arm extending from the hand lever pivot point so that the wheelchair occupant imparts reciprocal movement to the drive mechanism by reciprocally pivoting the second hand lever arm, thereby propelling the wheelchair; and (d) a means for fitting the drive wheel and the hand lever to the wheelchair so that the drive wheel is in frictional rolling contact with the propulsion wheel and the second hand lever arm is readily manually accessible to the wheelchair occupant, the drive wheel and hand lever fitting means including a side panel which fits onto a side of most conventional wheelchairs, wherein the drive wheel is mounted onto the side panel and the hand lever is pivotally mounted to the side panel prior to wheelchair, so that substantial installation is achieved by fitting the side panel onto the wheelchair.

5. A kit for retrofitting most conventional wheelchairs which have at least one propulsion wheel, for manual propulsion by the wheelchair occupant, comprising:

(a) a drive wheel engageable in frictional rolling contact with a propulsion wheel of most conventional wheelchairs so that the propulsion wheel is propelled by rotating the drive wheel;

(b) means for fitting the drive wheel onto said wheelchairs so that the drive wheel is in frictional rolling contact with the propulsion wheel;

(c) a drive mechanism for rotating the drive wheel while the drive wheel is in frictional rolling contact with the propulsion wheel, said drive mechanism being operably connected to the drive wheel so that imparting reciprocal movement to the drive mechanism rotates the drive wheel;

(d) a hand lever pivotally mountable to the wheelchair, the hand lever including (i) a first hand lever extending from a hand lever pivot point to a point of operable connection to the drive mechanism, said operable connection of the first hand lever to the drive mechanism including a drive bar connected at one end to the first hand lever arm and connected at another end to the drive mechanism, said drive bar being adjustable in length to provide a fit to wheelchairs of various lengths, and (ii) a second hand lever arm extending from the hand lever pivot point so that the wheelchair occupant imparts reciprocal movement to the drive mechanism by reciprocally pivoting the second hand lever arm, thereby propelling the wheelchair; and (e) a means for fitting the hand lever to the wheelchair so that the second hand lever arm is manually accessible to the occupant.

6. A method of retrofitting for manual propulsion a wheelchair having two conventional propulsion wheels respectively positioned on left and right sides of the wheelchair, the method comprising the steps of:

(a) providing a left side panel securable to the left side of the wheelchair and a right side panel securable to the right side of the wheelchair;

(b) mounting a drive wheel to each side panel such that each drive wheel is positioned in rolling contact with the propulsion wheel on a respective side of the wheelchair by securing the respective side panel to the wheelchair;

(c) connecting to each drive wheel a drive mechanism for rotating the drive wheel while the drive wheel is in frictional contact with the propulsion wheel, each drive mechanism being operable connected to its respective drive wheel such that imparting reciprocal movement to one of the drive mechanisms rotates the respective drive wheel;

(d) pivotally mounting a hand lever to each side panel at a hand lever pivot point, each hand lever including a first hand lever arm extending from the respective hand lever pivot point to a point of operable connection to the respective drive mechanism such that reciprocal movement is imparted to the drive mechanism by reciprocally pivoting the first hand lever arm, each hand lever further including a second hand lever arm extending from the respective hand lever pivot point to a point which is manually accessible to a wheelchair occupant when the respective side panel is secured to the wheelchair so that the occupant imparts reciprocal movement to at least one of the drive mechansims by reciprocally pivoting at least one of the respective second hand lever arms; and (e) securing the left and right side panels to the respettive left and right wheelchair sides so that each drive wheel is in frictional rolling contact with its respective propulsion wheel, and the wheelchair occupant propels the wheelchair by reciprocating at least one of the second hand lever arms.

* * * * *